(12) United States Patent
Loftus et al.

(10) Patent No.: US 10,406,937 B2
(45) Date of Patent: Sep. 10, 2019

(54) ELECTRIC VEHICLE CHARGER AND CHARGING METHOD

(71) Applicant: Ford Global Technologies, LLC, Dearborn, MI (US)

(72) Inventors: Michael Edward Loftus, Northville, MI (US); John Proietty, Ferndale, MI (US); Oleg Yurievitch Gusikhin, West Bloomfield, MI (US); Perry Robinson MacNeille, Lathrup Village, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1154 days.

(21) Appl. No.: 14/062,299

(22) Filed: Oct. 24, 2013

(65) Prior Publication Data

US 2015/0115886 A1 Apr. 30, 2015

(51) Int. Cl.
| | | |
|---|---|---|
| *B60L 11/18* | (2006.01) | |
| *B60L 53/14* | (2019.01) | |
| *B60L 53/00* | (2019.01) | |
| *B60L 53/30* | (2019.01) | |

(52) U.S. Cl.
CPC ............. *B60L 53/14* (2019.02); *B60L 53/00* (2019.02); *B60L 53/30* (2019.02); *B60L 2240/62* (2013.01); *B60L 2240/642* (2013.01); *B60L 2240/72* (2013.01); *B60L 2260/52* (2013.01); *B60L 2260/54* (2013.01); *Y02T 10/7005* (2013.01); *Y02T 10/7072* (2013.01); *Y02T 10/7291* (2013.01); *Y02T 90/12* (2013.01); *Y02T 90/121* (2013.01); *Y02T 90/14* (2013.01); *Y02T 90/16* (2013.01); *Y02T 90/162* (2013.01); *Y02T 90/163* (2013.01)

(58) Field of Classification Search
CPC .. H02J 7/00; H02J 7/14; B60W 20/00; B60W 20/104; B60W 20/108; B60L 11/1809; B60L 11/1816; B60L 11/1824; B60L 11/1838; B60L 11/1842; B60L 11/18; B60L 2260/50; B60L 2260/52; B60L 2260/54; B60L 2260/58; B60L 2240/62; B60L 2240/64; B60L 2240/642
USPC ............................ 320/106, 109; 701/22, 300
See application file for complete search history.

(56) References Cited

U.S. PATENT DOCUMENTS

| | | | |
|---|---|---|---|
| 5,973,460 A * | 10/1999 | Taga ........................ | B60K 6/26 318/139 |
| 7,665,559 B2 | 2/2010 | De La Torre-Bueno | |
| 8,918,240 B2 * | 12/2014 | Manickaraj ........... | B60W 20/00 180/65.8 |
| 2005/0274553 A1 | 12/2005 | Salman et al. | |

(Continued)

FOREIGN PATENT DOCUMENTS

CN 102881955 1/2013

*Primary Examiner* — Richard Isla
*Assistant Examiner* — Dung V Bui
(74) *Attorney, Agent, or Firm* — Carlson, Gaskey & Olds, P.C.

(57) ABSTRACT

An example electric vehicle charging method includes charging a battery of a vehicle using an external power source, and adjusting the charging based on a predicted amount of charging generated when driving the vehicle from the external power source to a destination. The external power source is at a higher elevation than some point along the route to the at least one destination.

20 Claims, 6 Drawing Sheets

(56) References Cited

U.S. PATENT DOCUMENTS

| | | | |
|---|---|---|---|
| 2011/0066308 A1* | 3/2011 | Yang | B60W 20/11 |
| | | | 701/22 |
| 2011/0213517 A1* | 9/2011 | Laws | B60W 10/26 |
| | | | 701/22 |
| 2011/0288737 A1 | 11/2011 | Carr | |
| 2012/0041629 A1* | 2/2012 | Yamada | B60K 6/48 |
| | | | 701/22 |
| 2012/0053771 A1* | 3/2012 | Yoshida | B60L 11/1842 |
| | | | 701/22 |
| 2012/0268066 A1* | 10/2012 | Endo | B60K 6/365 |
| | | | 320/109 |
| 2013/0175974 A1* | 7/2013 | Bassham | B60L 11/1837 |
| | | | 320/106 |
| 2013/0197730 A1* | 8/2013 | Huntzicker | B60L 11/16 |
| | | | 701/22 |
| 2013/0214737 A1* | 8/2013 | Wu | B60L 11/1838 |
| | | | 320/109 |
| 2013/0214738 A1* | 8/2013 | Chen | H02J 7/02 |
| | | | 320/109 |
| 2013/0229153 A1* | 9/2013 | Sarkar | B60L 11/1809 |
| | | | 320/130 |
| 2014/0361745 A1* | 12/2014 | Nishita | B60L 11/1824 |
| | | | 320/109 |
| 2015/0115886 A1* | 4/2015 | Loftus | B60L 11/1816 |
| | | | 320/109 |

\* cited by examiner

ELECTRIC VEHICLE CHARGER AND CHARGING METHOD

BACKGROUND

This disclosure relates generally to an electric vehicle and, more particularly, to efficiently charging a battery of the electric vehicle.

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), and battery electric vehicles (BEVs). Electric vehicles are typically equipped with a battery containing multiple battery cells that store electrical power for powering the electric machine. The battery may be charged prior to use, and recharged during a drive by regenerative braking or an internal combustion engine.

When traveling downhill, either mechanical or regenerative braking is often required to keep the electric vehicle at a safe speed. Regenerative braking can generate charge for the battery. If the battery is fully charged, the battery may not be able to accept the charge generated by the regenerative braking.

SUMMARY

An electric vehicle charging method according to an exemplary aspect of the present disclosure includes, among other things, charging a battery of a vehicle using an external power source, and adjusting the charging based in part on a predicted amount of charging generated when driving the vehicle from the external power source to a destination. The external power source is at a higher elevation than some point along the route to the at least one destination.

In a further non-limiting embodiment of the foregoing electric vehicle charging method, the adjusting comprises stopping the charging.

In a further non-limiting embodiment of any of the foregoing methods, the charging of the battery of the vehicle at the external power source comprises communicating power to the battery from a power source outside the vehicle.

In a further non-limiting embodiment of any of the foregoing methods, the charge that will be generated due to driving the vehicle from the external power source downhill to the destination comprises a regenerative charging.

In a further non-limiting embodiment of any of the foregoing methods, the method includes adjusting the charging such that the battery is charged, at the external power source, to a level that will result in the battery being nominally fully charged when the vehicle reaches a point of maximum cumulative regenerative charge, and such that the vehicle will store or utilize nominally all the charge generated when driving the vehicle from the external power source to the destination.

In a further non-limiting embodiment of any of the foregoing methods, the method, during the adjusting, accounts for charge used by the vehicle when driving the vehicle from the external power source to the destination.

In a further non-limiting embodiment of any of the foregoing methods, the adjusting comprises charging the battery of the vehicle at the external power source until the battery reaches a target level of charge that is less than a charge capacity of the battery.

In a further non-limiting embodiment of any of the foregoing methods, the charging of the battery at the external power source comprises communicating charging power from outside the vehicle to the vehicle.

In a further non-limiting embodiment of any of the foregoing methods, the adjusting comprises limiting the charging of the battery at the external power source to leave an amount of available charge storage in the battery, the amount of available charge storage corresponding generally to an amount of charge generated when driving the vehicle from the external power source to the destination.

In a further non-limiting embodiment of any of the foregoing methods, the method includes overriding the limiting to nominally fully charge the battery of the vehicle at the external power source.

In a further non-limiting embodiment of any of the foregoing methods, the method includes receiving the destination as an input.

In a further non-limiting embodiment of any of the foregoing methods, the at least one destination comprises a first destination and a second destination, the adjusting further based on a likelihood of the vehicle stopping at the first destination compared to a likelihood of the vehicle stopping at the second destination.

In a further non-limiting embodiment of any of the foregoing methods, the likelihood of the vehicle stopping at the first destination and the likelihood of the vehicle stopping at the second destination are based on past driving history.

An electric vehicle charger according to an exemplary aspect of the present disclosure includes, among other things, a sensor to detect a level of charge held in a battery of a vehicle, and a controller operably coupled to the sensor. The controller is configured to limit a charging of the battery from an external power source based on a predicted amount of charge generated when driving the vehicle from a location of the external power source to a destination. The external power source is at a higher elevation than a point along the route to the destination.

In a further non-limiting embodiment of the foregoing charger, the predicted amount of charge generated when driving the vehicle from the location of the external power source to the destination is based on a difference between an elevation of the location of the external power source and an elevation of a point along the route to the destination.

In a further non-limiting embodiment of any of the foregoing chargers, the location of the external power source is at a first elevation and a point along the route to the destination is at a second elevation that is less than the first elevation.

In a further non-limiting embodiment of any of the foregoing chargers, the vehicle provides an override option to permit fully charging the battery from the external power source.

In a further non-limiting embodiment of any of the foregoing chargers, wherein the external power source is separate and distinct from the vehicle.

In a further non-limiting embodiment of any of the foregoing chargers, the controller is configured to adjust the charging of the battery at the external power source such that the level of charge in the battery when the vehicle departs from the location of the external power source will result in the battery being fully charged when reaching a point of maximum cumulative regenerative charge, and the vehicle will utilize nominally all regenerative charge generated when driving from the external power source to the destination.

In a further non-limiting embodiment of any of the foregoing chargers, including a navigation system to provide elevation information about the location and the destination.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
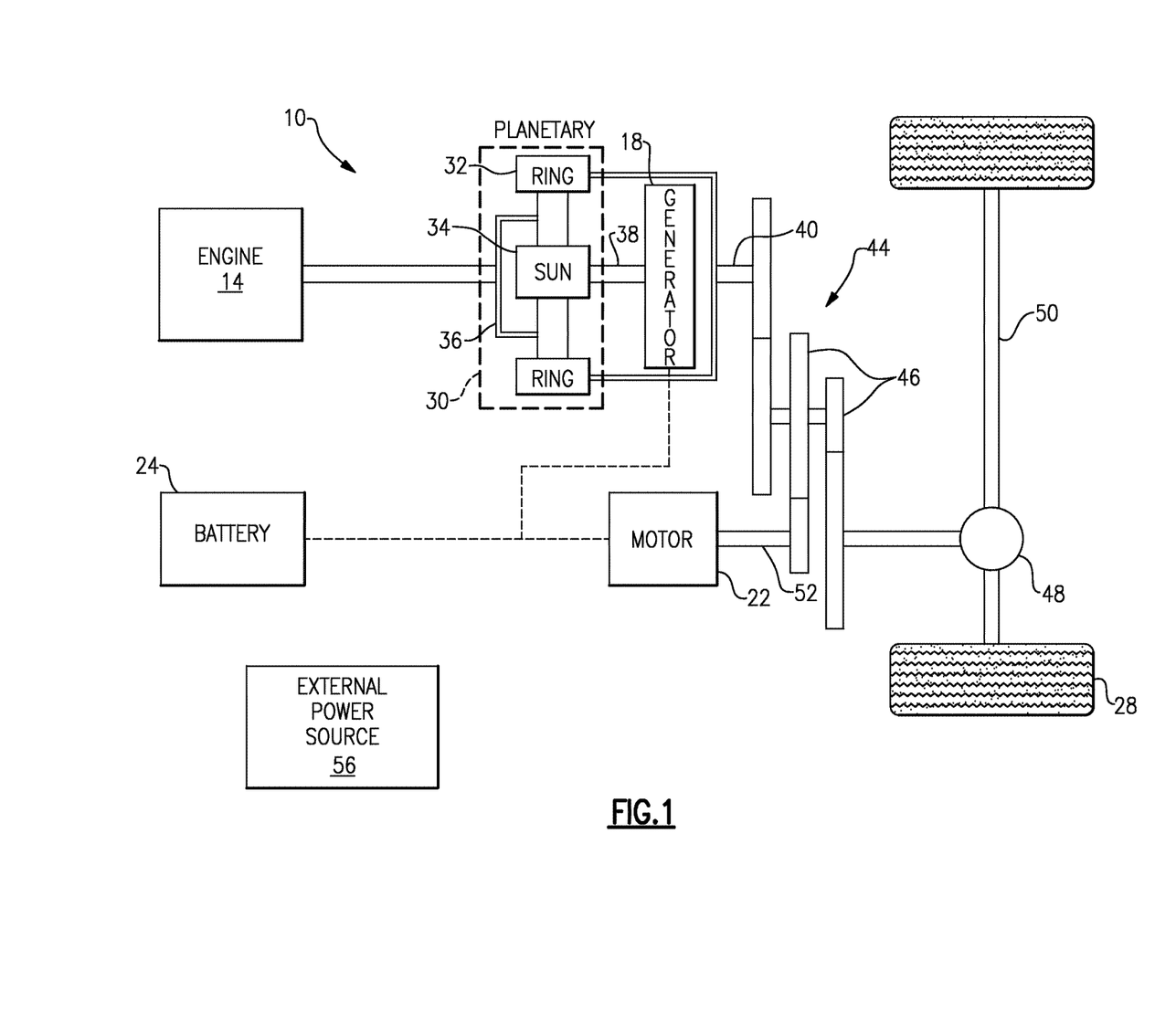
FIG. 1 illustrates a schematic view of an example powertrain architecture for an electric vehicle.

FIG. 1 schematically illustrates a powertrain 10 for an electric vehicle. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery 24. In this example, the second drive system is considered an electric drive system of the powertrain 10. The first and second drive systems generate torque to drive one or more sets of vehicle drive wheels 28 of the electric vehicle.

The engine 14, which is an internal combustion engine in this example, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery 24.

The battery 24 is an example type of electric vehicle battery assembly. The battery 24 may be a high voltage battery that is capable of outputting electrical power to operate the motor 22 and the generator 18. Other types of energy storage devices and/or output devices can also be used with the electric vehicle having the powertrain 10.

Regenerative braking can be used to charge the battery 24 when the vehicle is operating. When the vehicle is parked and not operating, an external power source 56, such as an electric vehicle charging station, can be used to charge the vehicle. The external power source forms a portion of an electric energy infrastructure that supplies electrical power for charging of the batteries of electric vehicles.

Figure 2:
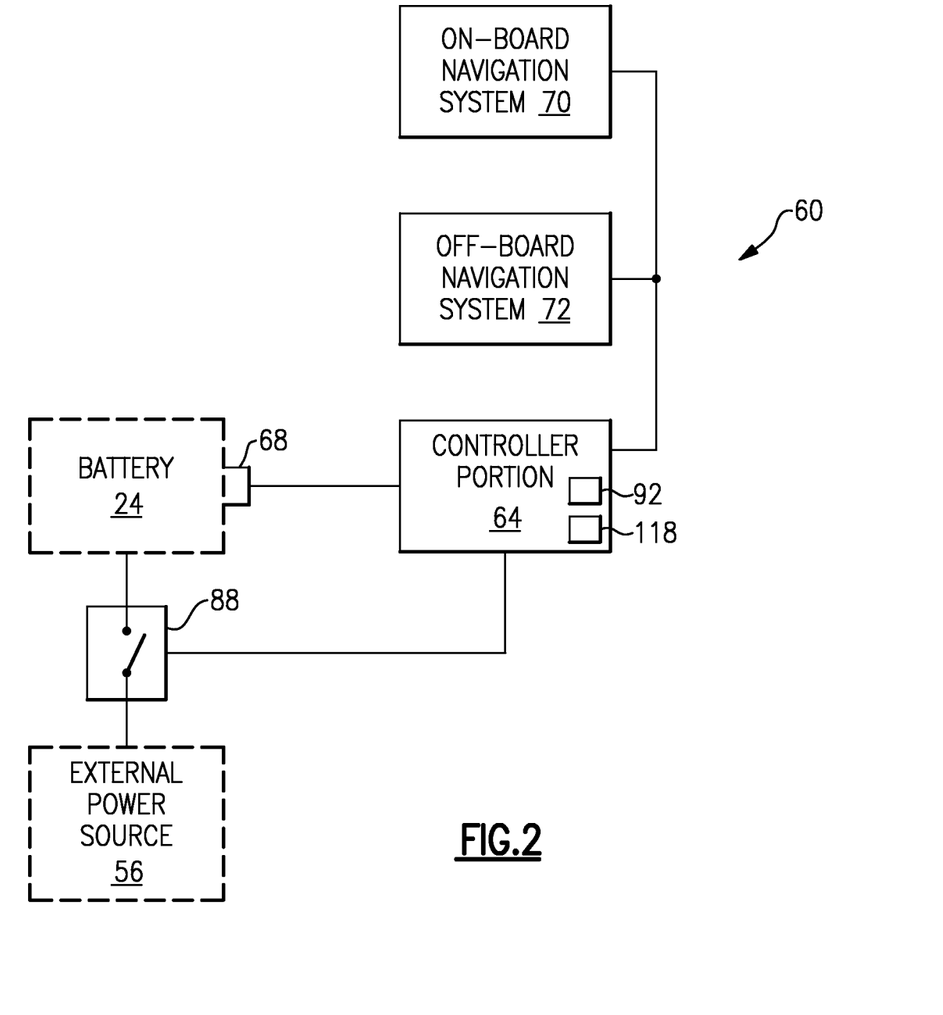
FIG. 2 illustrates a highly schematic view of an electric vehicle charger used in connection with the powertrain of FIG. 1.

Referring now to FIG. 2, with continuing reference to FIG. 1, an example electric vehicle charger 60 is used in connection with the battery 24 to monitor and control charging of the battery 24. The example electric vehicle charger 60 is used to control charging of the battery 24 so that regenerative charging is effectively utilized and so that a vehicle having the electric vehicle charger 60 descends and arrives at a destination with the battery 24 nominally fully charged.

Nominally fully charged, in the context of this disclosure, refers to the battery 24 being fully charged to its total capacity and the battery 24 having charge levels at insignificant distances from being fully charged, such as charged to 99.5 percent charge capacity. At such a level of charge, a person having skill in this art would recognize the battery 24 as being effectively fully charged.

The electric vehicle charger 60 includes a controller portion 64 and a sensor 68. The controller 64 opens and closes a switch 88 to selectively couple the battery 24 to an external power source 56. The electric vehicle charger 60 may be at least partially mounted to the vehicle, at least partially mounted to the external power source 56, or both. The controller 64 is an on-board vehicle controller in some examples such that the charger 60 is a slave to the vehicle. The sensor 68 can be calculated on-board the vehicle and communicated to the charger.

The controller 64 can communicate with a navigation system 70 that is on-board the vehicle, and a navigation system 72 that is off-board the vehicle. The navigation systems 70 and 72 provide the controller with information, such as elevation and distances, between the location of the external power source and various destinations.

The external power source 56 is separate from the powertrain 10 and other portions of the vehicle. The external power source 56 is a charging station at a home or workplace of a driver of the vehicle, for example. The external power source 56 provides power to the battery 24. The power from the external power source is not generated by any portion of the powertrain 10.

When the switch 88 of the electric vehicle charger 60 is closed, the battery 24 is coupled to the external power source 56, and the external power source 56 charges the battery 24. When the switch 88 is open, the battery 24 is decoupled from the external power source 56, and the external power source 56 does not charge the battery 24.

The controller 64, in this example, moves the switch 88 between the open and closed positions based on information from the sensor 68 about the charge level of the battery 24, and based on predicted charge data 92. The predicted charge data 92 includes, at least, a predicted amount of charge that will be generated by the vehicle when driving the vehicle from away from the location of the external power source 56 to a destination or a point of maximum cumulative regenerative charge Notably, a person having skill in this art and the benefit of this disclosure would understand how to predict the power that will be consumed by an electric vehicle when driving to a destination at a different elevation. The predicted power consumption may depend on weather, traffic conditions, etc. A predictive algorithm may be utilized to predict the power consumption. The predicted power consumption would take into account the power consumed by the vehicle when driving to the destination as well as the energy generated by the regenerative charging.

Figure 3:
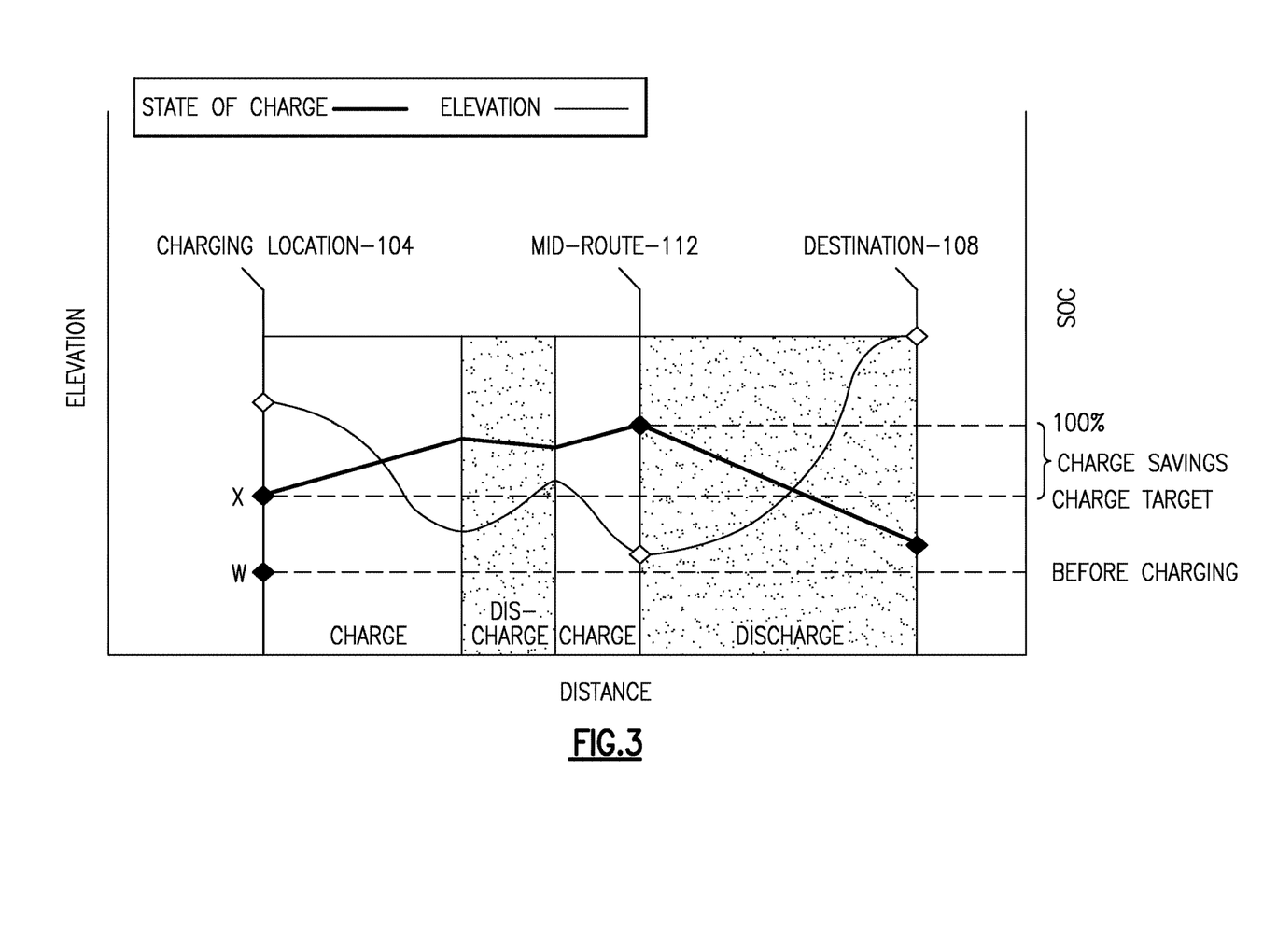
FIG. 3 illustrates an example charging strategy utilized by the electric vehicle charger of FIG. 2.
Figure 4:
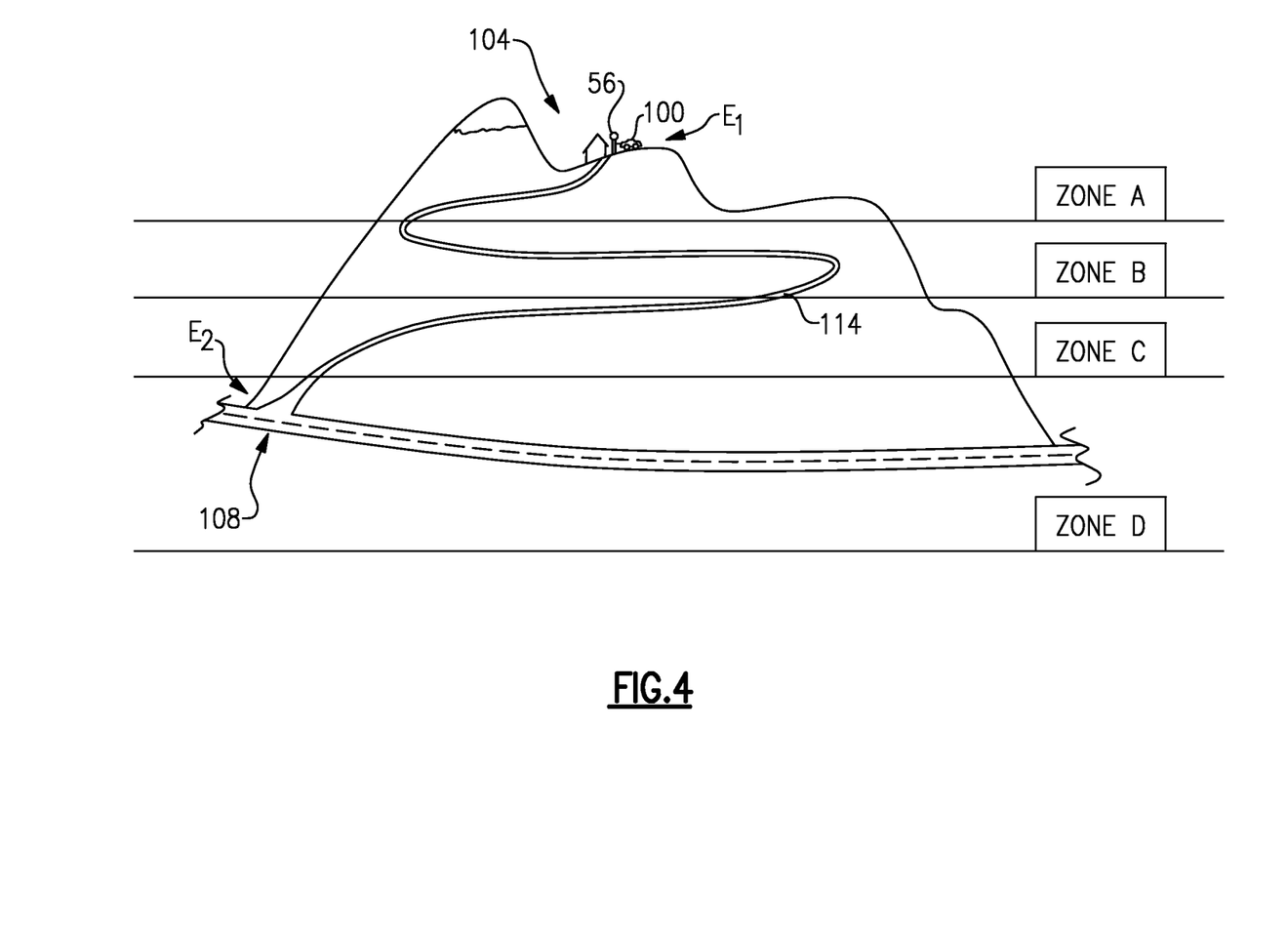
FIG. 4 illustrates an external power source at a first elevation and a destination at a second elevation lower than the first elevation.

Referring now to FIGS. 3 and 4 with continuing reference to FIG. 2, a vehicle 100 at a charging location 104 requires charging. The external power source 56 is at the charging location 104. In this example, the vehicle 100 arrives at the charging location 104 with a state of charge level of W. Utilizing route information from the navigation systems 70 and 72, the controller 64 calculates that along the route to a destination 108, there will be significant periods of regenerative braking to charge the battery 24 due primarily to changes in elevation.

The example controller 64 calculates that the regenerative braking can charge the battery 24 to 100% at a mid-route location 112. By predicting the energy used and generated along the route to the mid-route location 112, the charging strategy identifies that the vehicle 24 only needs to be charged at the charging location 104 to state of charge of level X, instead of 100%.

In this example, an algorithm used by the controller 64 can be characterized as calculating, for every point along a route, the estimated future cumulative charging up to that point minus the cumulative discharging up to that point. The point at which the difference is a maximum is where the SOC should be 100%. The algorithm then determines what initial SOC is required to make that maximum SOC value equal to 100%. If the resulting initial SOC is less than 100%, then savings are realized.

Referring now to FIGS. 5 to 8 with continuing reference to FIG. 2, the external power source 56 is at a first elevation $E_1$. A destination 96 for an example vehicle 100 having the powertrain 10 is at a second elevation $E_2$. The first elevation $E_1$ is higher than the second elevation $E_2$.

Figure 5:
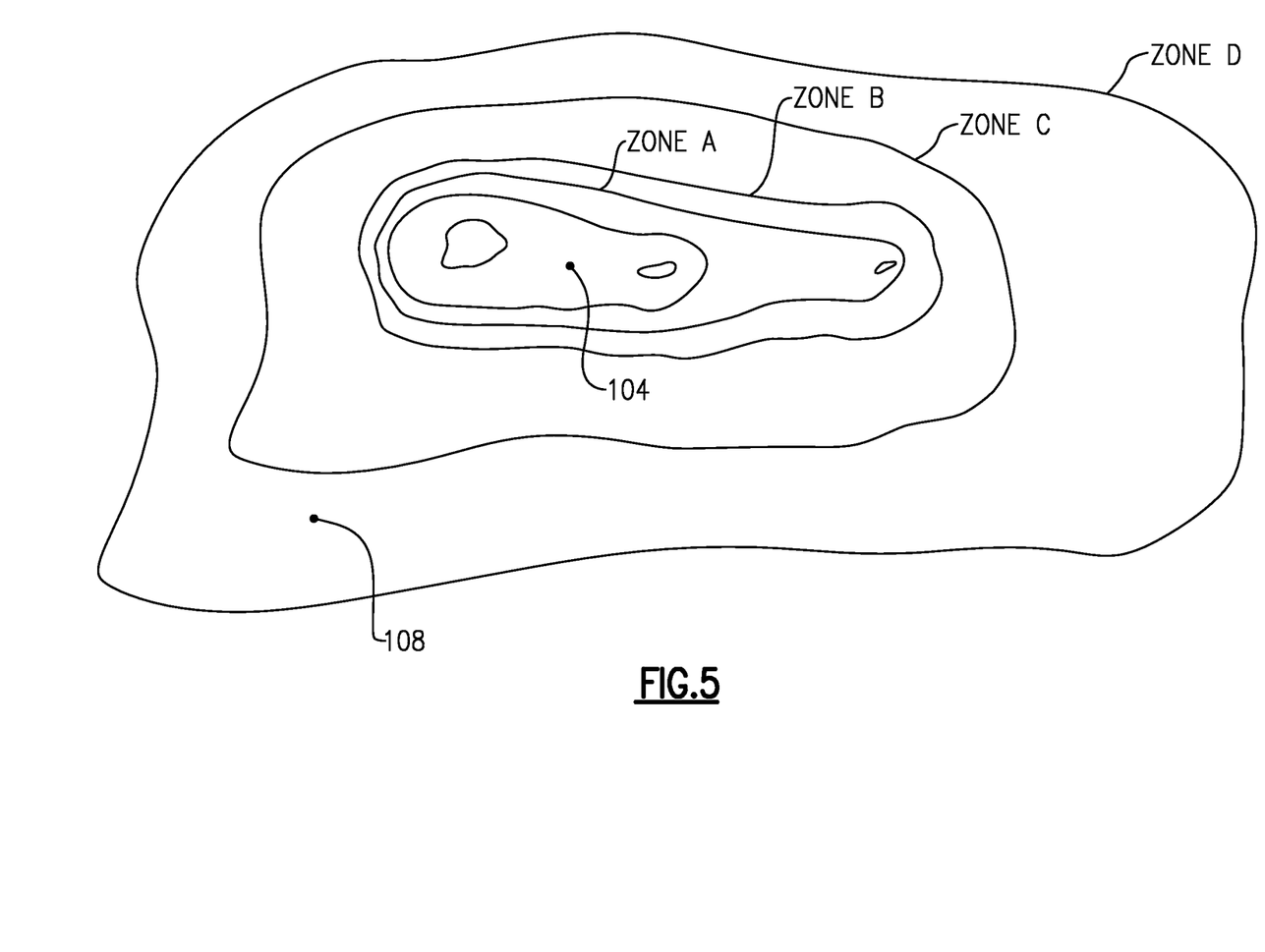
FIG. 5 is a topographical representation of the first elevation and the second elevation in FIG. 4.

As the vehicle 100 descends from the first elevation $E_1$ to the second elevation $E_2$, mechanical braking or regenerative braking is used to maintain the vehicle 100 at a safe speed. Regenerative braking using the motor 22 provides a regenerative charge. If the battery 24 is fully charged, the regenerative charge may be wasted. Alternatively, the mechanical brakes may be applied rather than using the motor 22, which wears the mechanical brakes and wastes energy by generating heat. The mechanical brakes generate no charge. The controller 64 ensures that the regenerative charge is utilized and not entirely wasted.

In this example, the controller 64 opens the switch 88 to prevent the external power source 56 from charging the battery 24 to a target level of charge above which the regenerative charging generated during a decent from the elevation $E_C$ to the elevation $E_D$ cannot be fully stored within the battery 24, used by the vehicle 100, or both. Although characterized as a physically actuating switch 88, those skilled in this art and having the benefit of this disclosure will understand that the switch 88 may take many forms, including digital electronic circuits that move between states.

The predicted charge data 92 can include an estimate of a total regenerative charge that will be generated as the vehicle 100 descends from the first elevation $E_1$ to the second elevation $E_2$. Based on this estimate of regenerative charge that will be generated during the descent, the controller 64 stops the external power source 56 from charging the battery 24 by opening the switch 88.

Figure 6:
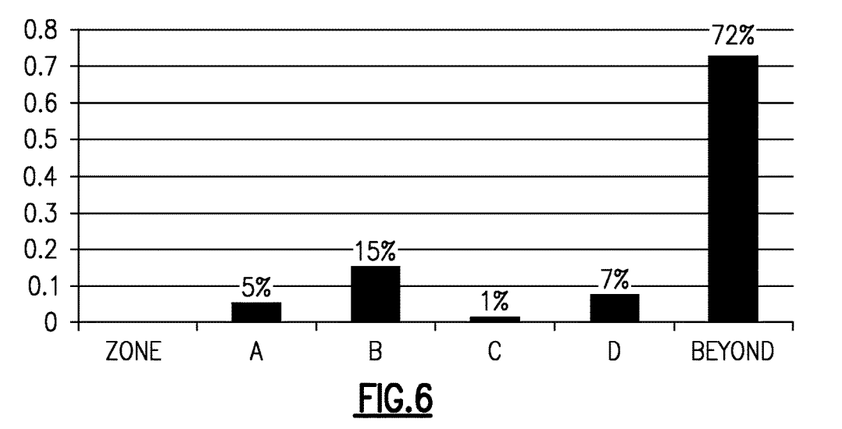
FIG. 6 graphically illustrates a likelihood of stopping a vehicle within a particular zone of Figures

The predicted charge data 92 may further include an estimate of the likelihood of the vehicle 100 stopping within a particular elevation zone (e.g., Zone A, Zone B, Zone C, Zone D, or beyond Zone D). The likelihood may be based, at least in part, on past driving history. The controller portion 64 can track driving history and predict the likelihood of the vehicle 100 driving to a particular elevation zone. The battery 24 is charged by the external power source 56 based, in part, on this information.

In one example, the amount of regenerative charge generated during a descent from the first elevation $E_1$ to the second elevation $E_2$ corresponds to 5% of the total storage capacity of the battery 24. Recognizing that the 5% capacity is needed to store charge the battery 24 during descent from the elevation $E_C$ to the elevation $E_D$, the controller 64 opens the switch 88 after the external power source 56 has charged the battery 24 to 95% of its total capacity (see FIG. 7). The vehicle then descends from the elevation $E_C$ to the elevation $E_D$. After reaching the elevation $E_D$, the battery 24 is fully or nominally fully charged (see FIG. 8).

Figure 7:
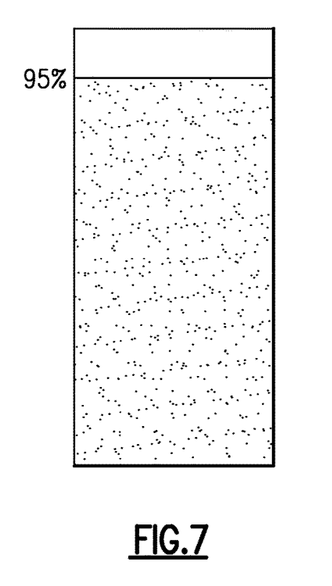
FIG. 7 illustrates a level of charge in a battery of the powertrain of FIG. 1 after completing a charge at a first elevation.
Figure 8:
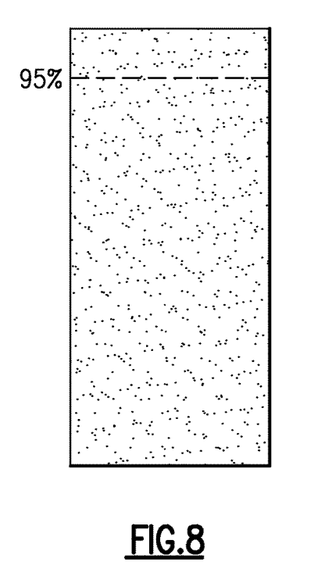
FIG. 8 illustrates the level of charge in the battery of the powertrain of FIG. 1 after descending from the first elevation to a second elevation lower than the first elevation.

Notably, where the external power source 56 to instead charge the battery 24 to greater than 95% of the total storage capacity of the battery 24, the 5% of regenerative charging provided during the descent from the elevation $E_1$ to the elevation $E_2$ would not be fully stored in the battery 24. In some examples, if the battery 24 is unable to store charge, mechanical brakes on the vehicle 100 are applied and charging from regenerative braking is not utilized.

The destination 108 can be programmed into the controller 64 by an operator of the vehicle when coupling the electric vehicle powertrain 10 to the external power source 56. The controller 64 can receive information about the destination 108 from an in-home application on the personal computer of a driver of the vehicle, a smart phone application, etc. The destination 108 may be provided to the controller 64 prior to starting the charging the battery 24 with the external power source 56, after starting the charging of the battery with the external power source 56, or both.

In some examples, inputting the destination 108 to the controller 64 is not required. For example, if the external power source 56 is at a home on a mountain, and the vehicle 100 typically descends 2,000 feet before reaching a main road from the home, the controller 64 can be programmed to account for a regenerative charge associated with regenerative braking during a 2,000-foot drop in elevation. Inputting a new destination each time the vehicle 100 is coupled to the external power source 56 for charging would then not be required.

The controller 64 may consider elevation changes in all directions from the external power source 56, or just elevation changes along roadways 114 from the external power source 56.

In some examples, the controller 64 or the vehicle provides an override option such as a switch 118. The override option permits fully charging the battery from the external power source. When the battery 24 is coupled to the external power source 56, the override switch 118 can be activated to override the controller 64 decoupling the battery 24 from the external power source 56 in response to the predicted charge data 92 or reaching the target level of charge.

When the target level of charge is less than a charge capacity of the battery 24, the override switch 118 permits the battery 24 to be nominally fully charged by the external power source 56. A user may choose to activate the override switch 118 when regenerative charging during a decent is not desired, for example.

Features of the disclosed examples include providing a charging method and vehicle charger that efficiently charges a battery of an electric vehicle utilizing available regenerative charging due to elevation changes when driving rather than charging with electrical power from an external power source. Fuel economy and owner satisfaction are enhanced. The method and charger decrease expenses for the owner, or driver. The method and charger decrease traction battery charge times, brake wear, carbon emissions, and pollution due to mechanical brake wear. The method can saves costs of energy to charge the vehicle, saved time to charge the vehicle, and can save wear on mechanical brakes The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An electric vehicle charging method, comprising:
charging a battery of a vehicle using an external power source, the charging occurring at a starting point; and
stopping the charging before the battery is nominally fully charged, the stopping based in part on a predicted amount of charging generated when driving the vehicle from the external power source to at least one destination, the external power source at a higher elevation than some point along the route to the at least one destination, wherein the at least one destination comprises a first destination and a second destination, the stopping based further on a likelihood of the vehicle stopping at the first destination compared to a likelihood of the vehicle stopping at the second destination, the second destination is different from the starting point.

2. The method of claim 1, wherein the charging of the battery of the vehicle at the external power source comprises communicating power to the battery from a power source outside the vehicle.

3. The method of claim 1, wherein the charge that will be generated due to driving the vehicle from the external power source downhill to the destination comprises a regenerative charging.

4. The method of claim 1, further comprising stopping the charging such that the battery is charged, at the external power source, to a level that will result in the battery being nominally fully charged when the vehicle reaches a point of maximum cumulative regenerative charge, and such that the vehicle will store or utilize nominally all the charge generated when driving the vehicle from the external power source to one of the at least one destinations.

5. The method of claim 1, wherein the stopping comprises stopping the charging before the battery reaches a target level of charge that is less than a charge capacity of the battery.

6. The method of claim 1, wherein the charging of the battery at the external power source comprises communicating charging power from outside the vehicle to the vehicle, and the stopping permits the vehicle to arrive at one of the at least one destinations with the battery nominally fully charged.

7. The method of claim 1, wherein the stopping comprising stopping the charging such that the battery has an amount of available charge storage corresponding generally to an amount of charge generated when driving the vehicle from the external power source to one of the at least one destinations.

8. The method of claim 7, further comprising overriding the stopping to cause the charging to nominally fully charge the battery of the vehicle at the external power source.

9. The method of claim 1, further comprising receiving the at least one destination as an input.

10. The method of claim 1, wherein the likelihood of the vehicle stopping at the first destination and the likelihood of the vehicle stopping at the second destination are based on past driving history.

11. An electric vehicle charger, comprising:
a sensor to detect a level of charge held in a battery of a vehicle; and
a controller operably coupled to the sensor, the controller configured to stop a charging of the battery from an external power source before the battery is nominally fully charged, the stopping based on a predicted amount of charge generated when driving the vehicle from a location of the external power source to a destination, the stopping based further on a likelihood of the vehicle traveling to the destination compared to a likelihood of the vehicle traveling to another, different destination that is different from the location of the external power source, the external power source at a higher elevation than a point along the route to the destination.

12. The charger of claim 11, wherein the predicted amount of charge generated when driving the vehicle from the location of the external power source to the destination is based on a difference between an elevation of the location of the external power source and an elevation of a point along a route to a destination.

13. The charger of claim 11, wherein the location of the external power source is at a first elevation and a point along a route to the destination is at a second elevation that is less than the first elevation.

14. The charger of claim 11, wherein the vehicle provides an override option to permit fully charging the battery from the external power source.

15. The charger of claim 11, wherein the external power source is separate and distinct from the vehicle.

16. The charger of claim 11, wherein the controller is configured to stop the charging of the battery at the external power source such that the level of charge in the battery when the vehicle departs from the location of the external power source will result in the battery being fully charged when reaching a point of maximum cumulative regenerative charge, and the vehicle will utilize nominally all regenerative charge generated when driving from the external power source to the destination.

17. The charger of claim 11, wherein the stopping permits the vehicle to arrive at the destination with the battery nominally fully charged and without overcharging the battery along the route to the destination.

18. An electric vehicle charging method, comprising:
    charging a battery of a vehicle using an external power source, the charging occurring at a starting point; and
    based in part on a predicted amount of regenerative charging generated as the vehicle descends when driving from the external power source to a first destination, and based further in part on a likelihood of the vehicle traveling to the first destination compared to a likelihood of the vehicle traveling to a different, second destination, the second destination different than the starting point,
    automatically stopping the charging before the battery is nominally fully charged such that the vehicle stores or utilizes nominally all the charge generated when driving the vehicle from the external power source to the first destination, and then arrives at the first destination with the battery nominally fully charged.

19. The method of claim 18, wherein the external power source is at a higher elevation than some point along the route to the destination.

20. The method of claim 19, wherein the first destination is in in a first elevation zone and the second destination is in a second elevation zone, an elevation of the first elevation zone different than an elevation of the second elevation zone, wherein the likelihood is based, at least in part, on past driving history.

* * * * *